US008787990B2

United States Patent
Marchand et al.

(10) Patent No.: US 8,787,990 B2
(45) Date of Patent: Jul. 22, 2014

(54) SYSTEM AND METHOD FOR CONTROLLING ELECTROMAGNETIC INTERFERENCE IN PORTABLE ELECTRONIC DEVICES HAVING A RADIO FREQUENCY SUBSYSTEM

(75) Inventors: Rene Pierre Marchand, Waterloo (CA); Lyall Kenneth Winger, Waterloo (CA); Christopher David Bernard, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 121 days.

(21) Appl. No.: 13/467,348

(22) Filed: May 9, 2012

(65) Prior Publication Data

US 2013/0301689 A1  Nov. 14, 2013

(51) Int. Cl.
*H04M 1/00* (2006.01)
*H04B 1/38* (2006.01)

(52) U.S. Cl.
CPC ........................ *H04B 1/38* (2013.01)
USPC ....................... 455/574; 455/343.1

(58) Field of Classification Search
CPC ..... G06F 1/3203; G06F 1/324; G06F 1/3237; H03K 5/1252; H04B 15/06; H04B 1/38; H04B 15/00; H04B 2001/0416; H04J 3/02; H04J 3/06; H04L 27/00; H03F 1/0227; H03F 2200/414; H03F 2200/417; H03F 2200/504; H03F 1/305; H03F 2203/7227; H03G 3/348

USPC ................. 455/127.1–127.5, 572–574, 455/343.1–343.6, 102–110; 375/219–238
See application file for complete search history.

(56) References Cited

U.S. PATENT DOCUMENTS

| 5,990,751 A * | 11/1999 | Takita .......................... 330/297 |
| 6,396,137 B1 | 5/2002 | Klughart |
| 6,476,683 B1 | 11/2002 | Saito et al. |
| 6,871,289 B2 | 3/2005 | Pullen et al. |
| 7,863,875 B1 | 1/2011 | Guo et al. |

(Continued)

OTHER PUBLICATIONS

European Patent Application No. 12167340.4, Extended Search Report dated Oct. 17, 2012.

(Continued)

*Primary Examiner* — Lana N Le
(74) *Attorney, Agent, or Firm* — Louis B. Allard; Borden Ladner Gervais LLP (57) ABSTRACT

A portable electronic device that has a radio frequency communication subsystem operationally connected switch-mode power supply subsystem. The switch-mode power supply subsystem generates a pulse-width modulation electrical signal that produces electromagnetic interference. The switch-mode power supply subsystem can reduce the slew rate of the pulse-width modulation electrical signal when the radio-frequency communication subsystem is active. This reduces the level of the electromagnetic interference signal only during radio frequency communication, which improves the efficiency of the radio frequency communication. Not having the reduced slew rate when there is no radio frequency communication allows for higher modulation efficiency.

8 Claims, 9 Drawing Sheets

(56) References Cited

U.S. PATENT DOCUMENTS

| | | |
|---|---|---|
| 8,008,902 B2 | 8/2011 | Melanson et al. |
| 8,542,061 B2 * | 9/2013 | Levesque et al. ............. 330/297 |
| 8,565,694 B2 * | 10/2013 | Jones et al. ................ 455/127.1 |
| 8,571,492 B2 * | 10/2013 | Berchtold et al. ............ 455/572 |
| 2002/0030543 A1 | 3/2002 | French et al. |
| 2005/0168168 A1 | 8/2005 | Elliott |
| 2006/0061419 A1 | 3/2006 | Edwards |
| 2007/0075744 A1 | 4/2007 | Ng |
| 2011/0285378 A1 | 11/2011 | Tamaoka |
| 2012/0013322 A1 | 1/2012 | Dearborn |
| 2012/0033720 A1 | 2/2012 | Brunel et al. |
| 2012/0282869 A1 * | 11/2012 | Southcombe et al. ..... 455/127.1 |

OTHER PUBLICATIONS

"NCV7380 LIN Transceiver", ON Semiconductor, http://onsemi.com, Semiconductor Components Industries, LLC, Feb. 2007, Rev. 2, pp. 1-14.

"AN-1072 GTLP Output Control Circuitry" Reduces Noise and Enhances System Performance, Fairchild Semiconductor Application Note, www.fairchildsemi.com, Feb. 1997, Revised Dec. 2000, pp. 1-6.

* cited by examiner

SYSTEM AND METHOD FOR CONTROLLING ELECTROMAGNETIC INTERFERENCE IN PORTABLE ELECTRONIC DEVICES HAVING A RADIO FREQUENCY SUBSYSTEM

FIELD OF THE DISCLOSURE

The present disclosure relates generally to portable electronic devices. More particularly, the present disclosure relates to portable electronic devices that run high power application and that have a radio frequency subsystem.

BACKGROUND OF THE DISCLOSURE

Present day portable electronic devices such as, for example, smart phones and tablets are equipped with high power processors required to run high powered applications such as graphics accelerators, three-dimensional gaming, etc., and are also equipped with a radio frequency (RF) communication subsystem. Typically, the high powered processors, running high powered applications, receive electrical power, from a power supply, in the form of a pulse-width modulated voltage signal. The pulse-width modulation (PWM) of the electrical voltage can produce considerable electromagnetic interference (EMI) that can cause deleterious effect in the RF subsystem. For example, these deleterious effects include a higher EMI noise floor, which can cause the portable electronic device to have to re-transmit messages numerous times in order for the messages to be properly transmitted.

Improvements in portable devices that have an RF subsystem and that run high power applications are therefore desirable.

BRIEF DESCRIPTION OF THE DRAWINGS

Embodiments of the present disclosure will now be described, by way of example only, with reference to the attached Figures, wherein.

DETAILED DESCRIPTION

Generally, the present disclosure provides a method and system to control the electromagnetic interference (EMI) generated by a portable electronic device. The EMI is reduced when the portable electronic device is conducting radio frequency communication, the reduced EMI allowing for more efficient communication.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to portable electronic devices that have a radio frequency subsystem. The portable electronic devices can also be referred to as mobile wireless communication devices, or as mobile communication devices, or as mobile devices. Examples of applicable portable electronic include cellular phones, cellular smart-phones, handheld wireless communication devices, tablet computers (which can be referred to simply as tablets) and the like.

The mobile device is a two-way communication device with data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device. To aid the reader in understanding the structure of the mobile device, reference will now be made to FIG. 1.

Figure 1:
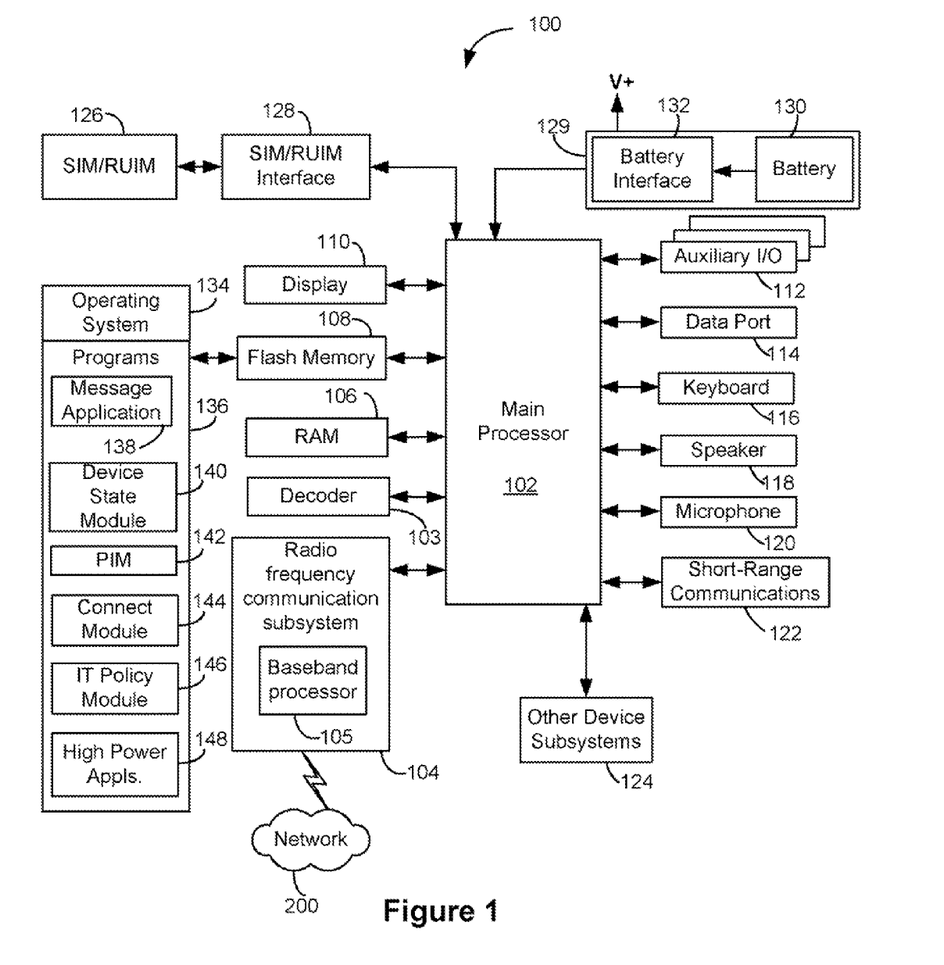
FIG. 1 shows a block diagram example of a portable electronic device.

Shown in FIG. 1, is a block diagram of an exemplary embodiment of a portable electronic device 100. The portable electronic device 100 includes a number of components such as a main processor 102 that controls the overall operation of the portable electronic device 100. Communication functions, including data and voice communications, are performed through a radio frequency (RF) communication subsystem 104. Data received by the portable electronic device 100 can be decompressed and decrypted by decoder 103, operating according to any suitable decompression techniques (e.g. YK decompression, and other known techniques) and encryption techniques (e.g. using an encryption techniques such as Data Encryption Standard (DES), Triple DES, or Advanced Encryption Standard (AES)). The RF communication subsystem 104 receives messages from, and sends messages to, a wireless network 200. In this exemplary embodiment of the portable electronic device 100, the RF communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the RF communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications. The RF communication subsystem 104 can comprise a baseband processor 105 that manages the functions of the communication system 104.

Although the wireless network 200 associated with portable electronic device 100 is a GSM/GPRS wireless network in one exemplary implementation, other wireless networks may also be associated with the portable electronic device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. The display 110 can include a touch-sensitive display.

Some of the subsystems of the portable electronic device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The portable electronic device 100 can send and receive communication signals over the wireless network 200 after required network registration or activation procedures have been completed. Network access is associated with a subscriber or user of the portable electronic device 100. To identify a subscriber, the portable electronic device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the portable electronic device 100 and to personalize the portable electronic device 100, among other things. Without the SIM/RUIM card 126, the portable electronic device 100 is not fully operational for communication with the wireless network 200. By inserting the SIM/RUIM card 126 into the SIM/RUIM interface 128, a subscriber can access all subscribed services. Services may include: web browsing and messaging such as e-mail, voice mail, Short Message Service (SMS), and Multimedia Message Service (MMS). More advanced services may include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical portable electronic device. The SIM/RUIM card 126 may store additional subscriber information for a portable electronic device as well, including datebook (or calendar) data and recent call data. Alternatively, user identification data and other data items can also be programmed into the flash memory 108.

The portable electronic device 100 is a battery-powered device and includes a battery interface 132 for receiving one or more rechargeable batteries 130. The battery interface 132 and the battery 130 are comprised in a switch-mode power supply subsystem 129 described in greater detail below. In at least some embodiments, the battery 130 can be a smart battery with an embedded microprocessor. The switch-mode power supply subsystem 129 includes a DC to DC converter, which can include a buck converter, a boost converter, or both, and a slew rate controller; embodiments of which are shown and described elsewhere in the present disclosure. The DC to DC converter assists the battery 130 in providing a voltage V+ to the portable electronic device 100 (e.g., V+ can be provided to the main processor 102, or to any other power-consuming component of the portable electronic device 100). Although current technology makes use of a battery, future technologies such as micro fuel cells or capacitor-based power supplies may provide the power to the portable electronic device 100. As will be understood by the skilled worker, batteries, micro fuel cells, capacitor-based based power supplies, or any other device that can produce an electrical output usable by the portable electronic device 100, can all be referred to as electrical energy sources. In some embodiments, the switch-mode power supply subsystem 129 can be operationally connected to the RF communication subsystem 104; the connection can be done through the main processor 102. Such embodiments are described elsewhere in the present disclosure.

The portable electronic device 100 also includes an operating system 134 and software components 136 to 146 which are described in more detail below. The operating system 134 and the software components 136 to 148 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the portable electronic device 100 during its manufacture. Other software applications include a message application 138 that can be any suitable software program that allows a user of the portable electronic device 100 to send and receive electronic messages. Various alternatives exist for the message application 138 as is well known to those skilled in the art. Messages that have been sent or received by the user are typically stored in the flash memory 108 of the portable electronic device 100 or some other suitable storage element in the portable electronic device 100. In at least some embodiments, some of the sent and received messages may be stored remotely from the device 100 such as in a data store of an associated host system that the portable electronic device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the portable electronic device 100 is turned off or loses power.

The PIM 142 includes functionality for organizing and managing data items of interest to the user, such as, but not limited to, e-mail, contacts, calendar events, appointments, and task items. The PIM 142 can also organize and manage any voice mails recorded on the portable electronic device 100. A PIM application has the ability to send and receive data items via the wireless network 200. PIM 142 data items may be seamlessly integrated, synchronized, and updated via the wireless network 200 with the portable electronic device subscriber's corresponding data items stored in, or accessible by, a host computer system. This functionality creates a mirrored host computer on the portable electronic device 100 with respect to such items. This can be particularly advantageous when the host computer system is the portable electronic device subscriber's office computer system.

The portable electronic device 100 also includes a connect module 144, and an information technology (IT) policy module 146. The connect module 144 implements the communication protocols that are required for the portable electronic device 100 to communicate with the wireless infrastructure and any host system, such as an enterprise system, that the portable electronic device 100 is authorized to interface with.

The connect module 144 includes a set of application programming interfaces (APIs) that can be integrated with the portable electronic device 100 to allow the portable electronic device 100 to use any number of services associated with the enterprise system. The connect module 144 allows the portable electronic device 100 to establish an end-to-end secure, authenticated communication pipe with the host system. A subset of applications for which access is provided by the connect module 144 can be used to pass information technology (IT) policy commands from the host system to the portable electronic device 100. This can be done in a wireless or wired manner. These instructions can then be passed to the IT policy module 146 to modify the configuration of the device 100. Alternatively, in some cases, the IT policy update can also be done over a wired connection.

The subset of software applications 136 can also include high power applications 148. Examples of such high power applications include, for example, three-dimensional gaming, web browsing, video conference calling, and video recording.

Other types of software applications can also be installed on the portable electronic device 100. These software applications can be third party applications, which are added after the manufacture of the portable electronic device 100. Examples of third party applications include games, calculators, utilities, etc.

The additional applications can be loaded onto the portable electronic device 100 through at least one of the wireless network 200, the auxiliary input/output (I/O) subsystem 112, the data port 114, the short-range communications subsystem 122, or any other suitable device subsystem 124. This flexibility in application installation increases the functionality of the portable electronic device 100 and may provide enhanced on-device functions, communication-related functions, or both. For example, secure communication applications may enable electronic commerce functions and other such financial transactions to be performed using the portable electronic device 100.

The data port 114 enables a subscriber to set preferences through an external device or software application and extends the capabilities of the portable electronic device 100 by providing for information or software downloads to the portable electronic device 100 other than through a wireless communication network. The alternate download path may, for example, be used to load an encryption key onto the portable electronic device 100 through a direct and thus reliable and trusted connection to provide secure device communication.

The data port 114 can be any suitable port that enables data communication between the portable electronic device 100 and another computing device. The data port 114 can be a serial or a parallel port. In some instances, the data port 114 can be a USB port that includes data lines for data transfer and a supply line that can provide a charging current to charge the battery 130 of the portable electronic device 100.

The short-range communications subsystem 122 provides for communication between the portable electronic device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the RF communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 may be an alphanumeric keyboard, a telephone-type keypad, or both. Alternatively, instead of having a keyboard 116, keyboard functionality can be provided to the user through a touch-sensitive display that may be included in the display 110. Other types of keyboards may also be used. A composed item may be transmitted over the wireless network 200 through the RF communication subsystem 104.

For voice communications, the overall operation of the portable electronic device 100 is substantially similar, except that the received signals are output to the speaker 118, and signals for transmission are generated by the microphone 120. Alternative voice or audio I/O subsystems, such as a voice message recording subsystem, can also be implemented on the portable electronic device 100. Although voice or audio signal output is accomplished primarily through the speaker 118, the display 110 can also be used to provide additional information such as the identity of a calling party, duration of a voice call, or other voice call related information.

The scope of the present disclosure encompasses reducing EMI produced by a portable electronic device only when the portable electronic device receives or transmits a radio frequency signal. The reduction of the EMI is effected by reducing the slew rate of a modulated signal produced by the power supply of the portable electronic device. As will be shown below, the present disclosure may allow for a portable electronic device that has improved RF communication efficiency as well an improved battery lifetime. That is, by reducing the slew rate of the output electrical signal generated by the switch-mode power supply subsystem during RF activity (RF transmission or RF reception) of the portable electronic device, the EMI signal generated by the device is reduced, which leads to more efficient RF activity. Simply stated, as there is a lower EMI signal (reduced EMI signal), a RF signal being received or transmitted by the portable electronic device will be disturbed to a lesser extent than if the slew rate had not been reduced and the EMI signal were full strength. As such, the RF signal in question can be received or transmitted by the portable electronic device without having to repeat the receive or transmit step as often as would be necessary if the EMI signal were full strength. With respect to the improved battery lifetime, as the present disclosure reduces the slew rate only during RF activity, the resistive losses occurring in resistors used to reduce the slew rate occur only when there is RF activity. This allows for less energy dissipation than if the slew rate were always at its reduced value in order to minimize EMI in order to improve RF communication efficiency.

Figure 2:
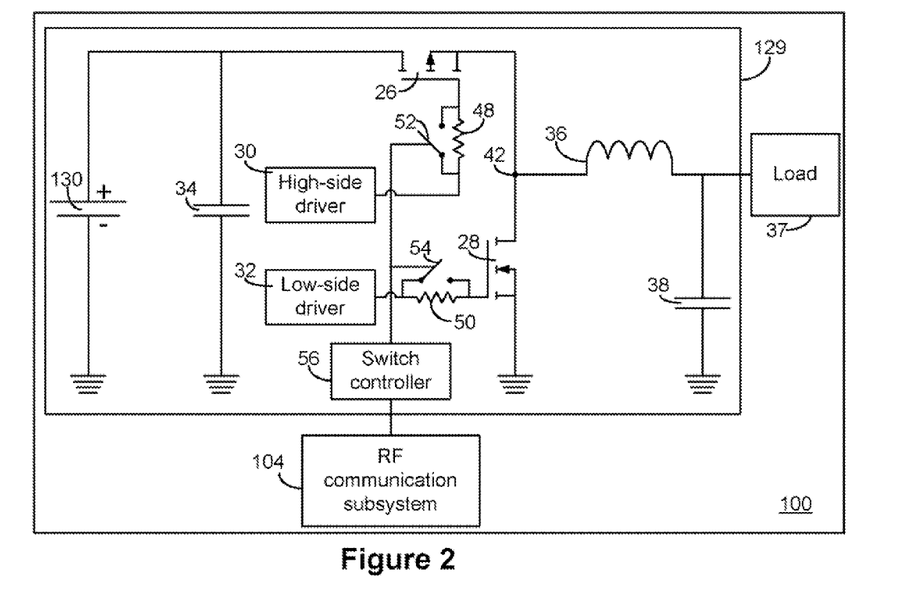
FIG. 2 shows another example of a portable electronic device.

FIG. 2 shows an embodiment of a portable electronic device 100 in accordance with the present disclosure. The portable electronic device 100 comprises a switch-mode power supply subsystem 129 operationally coupled to a RF communication subsystem 104. The switch-mode power supply subsystem 129 includes buck converter circuitry, an example of which is the buck converter circuitry 24 shown at FIG. 3. The buck converter circuitry 24 includes a battery 130 (a direct current voltage source), a metal-oxide-semiconductor field-effect transistor (MOSFET) 26 and a MOSFET 28. The MOSFET 26 is driven by the high-side driver 30; the MOSFET 28 is driven by the low side driver 32. Even though the MOSFET 26 and the MOSFET 28 are shown as being driven by separate drivers, this need not be the case. For example, a single driver may be used to drive both MOSFETs. A filter capacitor 34 is connected between the positive side of the battery 130 and the ground. An output electrical signal is provided to the output 40 to which a load can be electrically connected. The output electrical signal at output 40 is a filtered output of the electrical signal present at node 42. The filtering is provided by the inductor 36 and the capacitor 38.

Figure 3:
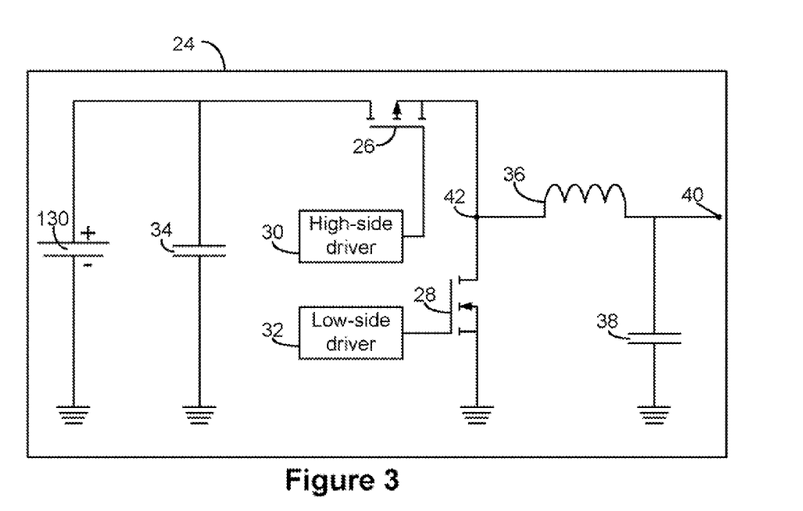
FIG. 3 shows buck converter circuitry used in the example of FIG. 2.

The buck converter circuitry 24 is part of a wider class of circuitry know as DC to DC converters, which includes buck converter circuitry, boost converter circuitry, and buck/boost converter circuitry.

As is known in the art, when the output 40 is connected to a high power load, for example, a processor running high-power applications, the buck converter circuitry 24 can be set to operate in a pulse-width modulation mode. In this case, the high-side driver 30 and the low-side driver 32 drive their respective MOSFET very hard (high slew rate) at a predetermined frequency. The high slew rate is made possible by the MOSFETs 26 and 28, which have very little resistance and therefore very little resistive losses. As an alternative to MOSFETs, insulated-gate bipolar transistors (IBGTs) can be used.

Figure 4:
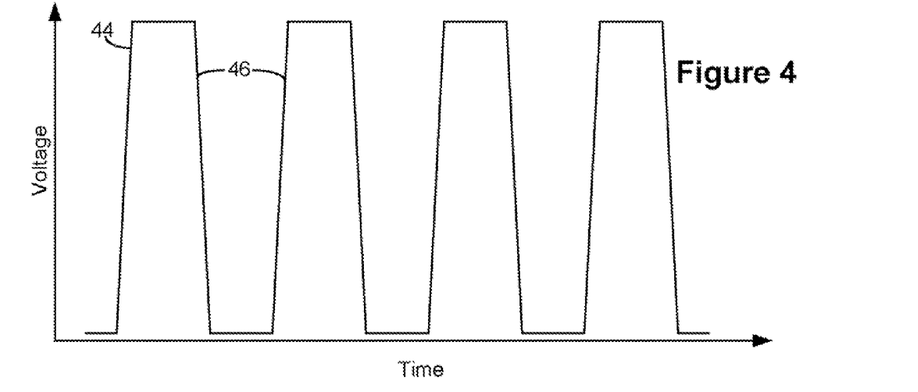
FIG. 4 shows an electrical signal generated by the buck converter circuitry of FIG. 3.

FIG. 4 shows an example plot 44 of voltage as a function of time as measured at node 42 of the buck converter 24. As is know in the art, the slew rate of an electrical signal can be defined as the maximum of the absolute value of the derivative of voltage as a function of time. In plot 44, the slew rate is simply a measure of the slope of the edges 46 of the plot. With reference to FIG. 3, the harder the MOSFETs 26 and 28 can be switched (low resistive losses), the sharper the edges 46 will be. However, the sharper the edges 46, the more electromagnetic interference (EMI) there is.

Returning to the embodiment of FIG. 2, the switch-mode power supply subsystem 129 includes the buck converter circuitry 24 of FIG. 3 to which resistors 48 and 50, and switches 52 and 54, have been added. The resistor 48 is connected in series between the high-side driver 30 and the gate of the MOSFET 26. The switch 52 is connected at opposite ends of the resistor 52. The resistor 50 is connected in series between the low-side driver 32 and the gate of the MOSFET 28. The switch 54 is connected at opposite ends of the resistor 50. Additionally, a switch controller 56 is electrically connected to the switches 52 and 54. The switches 52 and 54 are controlled by the switch controller 56, which is controlled by the RF communication subsystem 104 as described further below. Alternatively, the switch controller 56 can be formed in the RF communication subsystem 104 without departing from the scope of the present disclosure. Any suitable type of switches can be used as switches 52 and 54, including any suitable type of transistor, without departing from the scope of the present disclosure. Any suitable type of resistors can be used as resistors 48 and 50, including any suitable grouping of resistors and any suitable variable resistance resistor assembly, without departing from the scope of the present disclosure. As shown in FIG. 2, the output of the switch-mode power supply assembly 129 is electrically connected to a load 37. When the switches 52 and 54 are closed, the voltage signal at node 42 of FIG. 2 is the same as that at the node 42 of FIG. 3. That is, the voltage signal in both cases is as shown in the plot of FIG. 4.

When the RF communication subsystem 104 is neither receiving nor transmitting a RF signal, the switches 52 and 54 are closed and the MOSFETs 26 and 28 are driven hard to produce, at the node 42, the voltage signal shown at plot 44 of FIG. 4. This mode of operation (closed switches) allows for low resistive losses in the portable electronic device 100, which allows for prolonged time periods between charging the battery 130. That is, having the switches closed allow for higher (improved) efficiency of the switch-mode power supply subsystem 129 or higher (improved) modulation efficiency of the switch-mode power supply subsystem 129. When the RF communication subsystem 104 is inactive but is set to become active, that is, when the RF communication subsystem 104 is neither receiving nor transmitting and RF signal but is set to begin receiving or transmitting an RF signal, it provides a status signal (also referred to as a RF activity status signal) to the switch controller 56 to signal the controller to open the switches 52 and 54. By opening the switches 52 and 54, additional resistive losses are produced by the resistors 48 and 50, and the slew rate (modified slew rate) of the voltage signal produced at node 42 is reduced, which reduces the amount of EMI generated. The reduction in EMI benefits the reception and the transmission of an RF signal in that there is less EMI to interfere with the RF signal. As an example, in a portable electronic device using the Discontinuous Reception (DRX) protocol, the RF communication subsystem 104 wakes up at fixed time intervals to communicate with the network 200 (shown in FIG. 1). The baseband processor 105 of the RF communication subsystem 104 can be aware of the DRX settings and can control the switches 52 and 54, through the switch controller 56, accordingly. That is, the baseband processor 105 can signal the switch controller 56 to open the switches 52 and 54 just before the RF communication subsystem 104 wakes up to service pings from the network 200. Also, the baseband processor 105 can signal the switch controller to close the switches just after the RF communication subsystem 104 goes to sleep. Further, if a user of the portable electronic device 100 wishes to place a telephone call or send a message using the RF communication subsystem 104, manipulation of the portable electronic device 100 by the user to place the call or send the message (i.e., the user activating appropriate controls of the portable electronic device 100) will cause the baseband processor 105 to signal the switch controller to open the switches 52 and 54 just before placing the call or sending the message. The baseband processor 105 will signal the switch controller 56 to close the switches 52 and 54 just after the call is finished or just after the message has been sent.

Figure 5A:
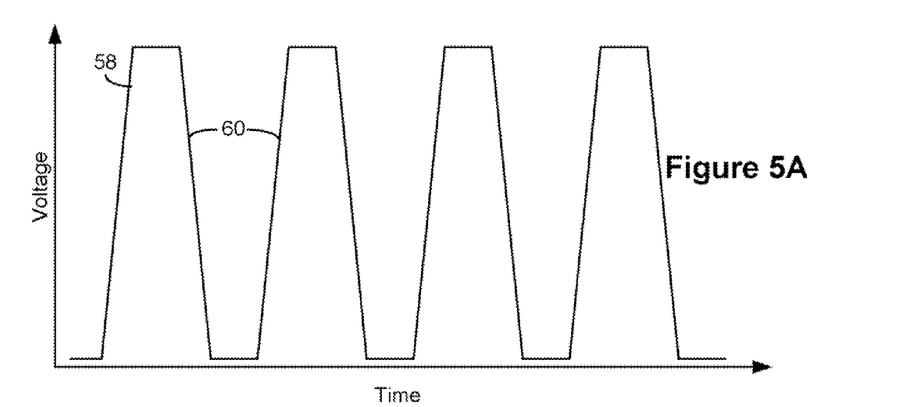
FIG. 5A shows an electrical signal having a reduced slew rate.
Figure 5B:
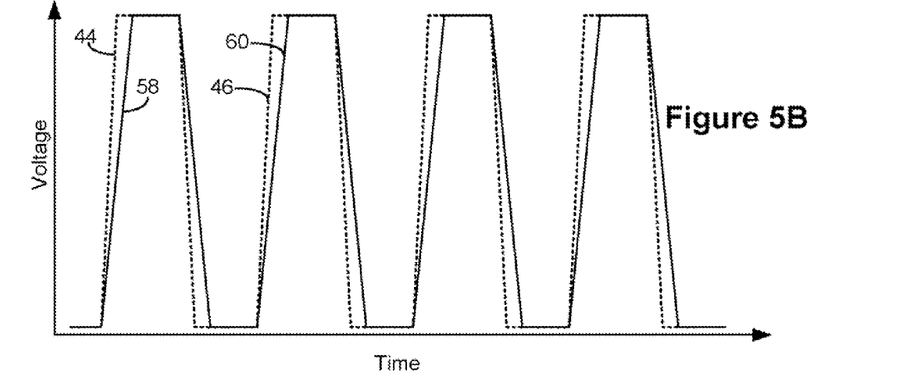
FIG. 5B shows superimposed electrical signals.

FIG. 5A shows a plot 58 of voltage a function of time, as measured at node 42 of FIG. 2, when the switches 52 and 54 are open. The edges of the plot 58 are indicated at reference numeral 60. FIG. 5B shows a superposition of plots 44 (dotted line) and 58 (solid line), where the change in the slew rate is evidence by the different slope of the edges 46 and 60.

Figure 6A:
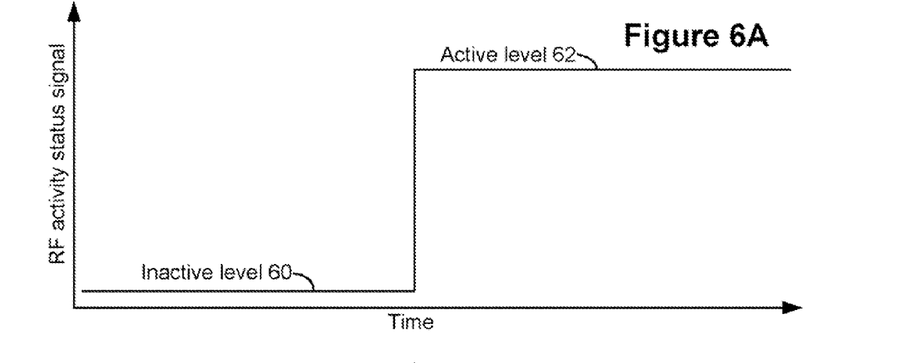
FIG. 6A shows a radio frequency activity status signal as a function of time.
Figure 6B:
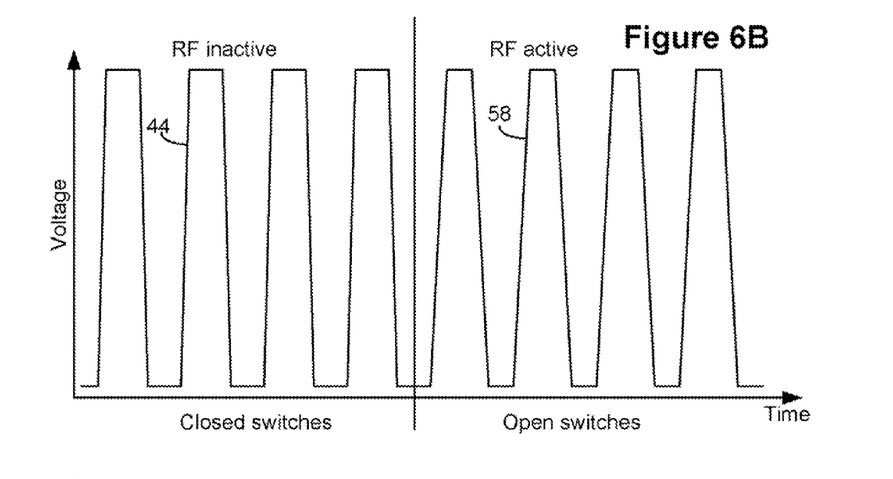
FIG. 6B shows an electrical signal as a function of time.
Figure 6C:
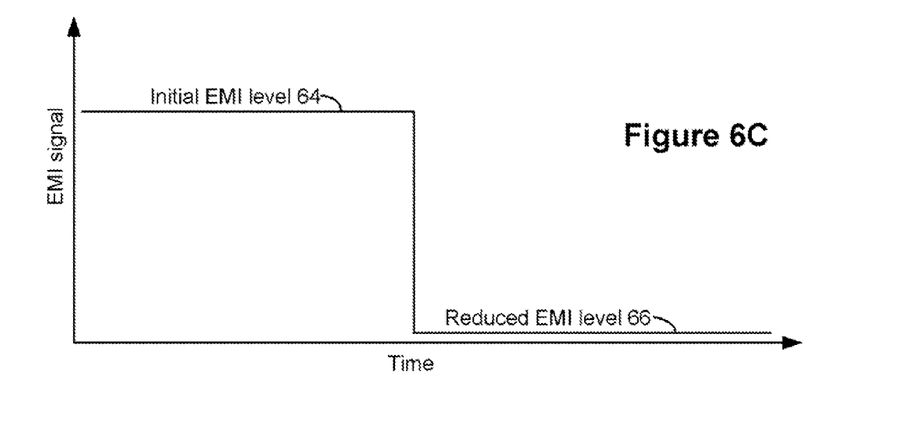
FIG. 6C shows an electromagnetic interference signal as a function of time.

FIGS. 6A-6C shows how the RF activity status signal going from an inactive level (inactive status) to an active level (active status) affects the voltage profile and slew rate of the pulse-width modulation signal generated at node 42 of FIG. 2 and, how this affects the level of electromagnetic interference emission. At FIG. 6A, the RF activity status signal is shown going from an inactive level 60 to an active level 62. FIG. 6B show the behavior of the pulse-width modulated signal (measured at node 42 of FIG. 2) before and after the RF activity status signal goes from the inactive level 60 to the active level 62. As shown in FIG. 6B, when the RF activity status signal is at the inactive level (i.e., when the switches 52 and 54 are closed), the voltage profile is the same as that of plot 44 of FIG. 4. When the RF activity status signal is at the active level (i.e., when the switches 52 and 54 are open), the voltage profile is the same as that of plot 58 of FIG. 5A. FIG. 6C shows how the EMI signal is at an initial level 64 when the RF activity status signal is at the inactive level 60 (closed switches 52 and 54). FIG. 6C also shows how the EMI signal is at a reduced EMI level the RF activity signal is at the active level 62 (open switches 52 and 54).

Figure 7A:
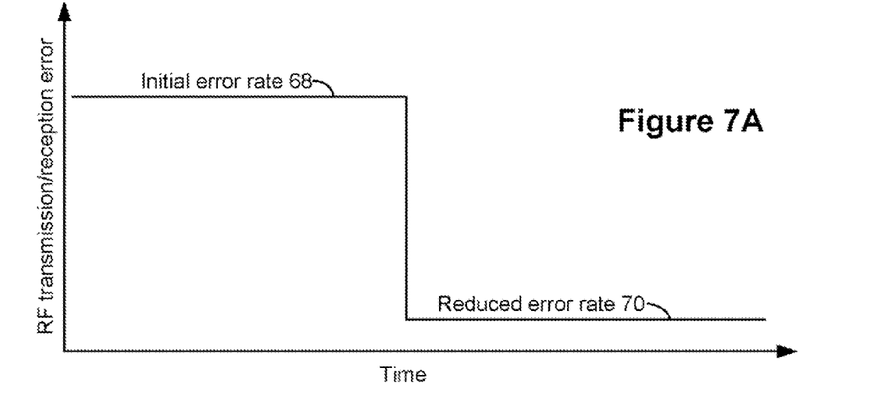
FIG. 7A shows a radio frequency transmission/reception error rate as a function of time.

With the reduction of the initial EMI level 64 to the reduced EMI level 66 comes a reduction in the RF transmission/reception error rate as shown at FIG. 7A, which shows an initial error rate 68 when the RF activity status signal is at the inactive level 60 (closed switches 52 and 54) and a reduced error rate 70 when the RF activity status signal is at the active level (i.e., when the switches 52 and 54 are open).

Figure 7B:
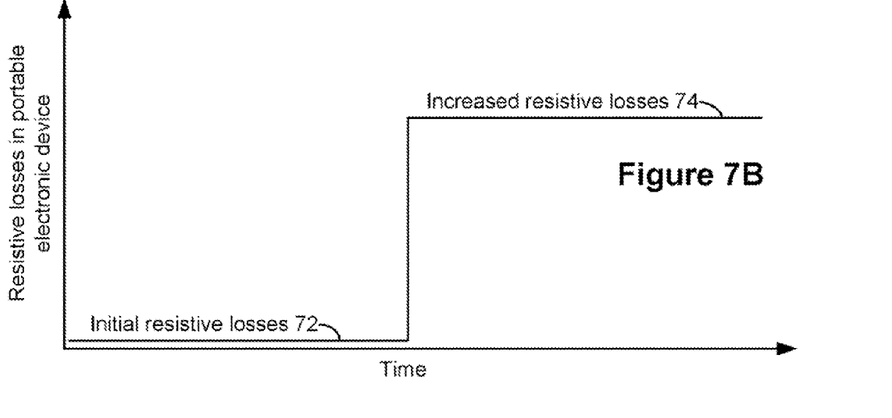
FIG. 7B shows resistive losses of a portable electronic device a function of time.

When reducing the EMI during RF activity, the resistive losses in the portable electronic device 100 increases. This is shown at FIG. 7B which shows the initial resistive losses going from initial resistive losses 72, when the RF activity status signal is at the inactive level 60 (closed switches 52 and 54), to increased resistive losses 74, when the RF activity status signal is at the active level (i.e., when the switches 52 and 54 are open).

As will be understood by the skilled worker, having the status signal going from an active level to an inactive level would have the effect of reversing the time axis in the graphs shown at FIGS. 6A-6C and FIGS. 7A and 7B.

Figure 8A:
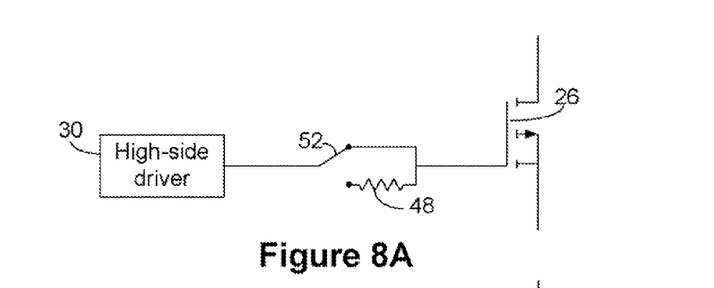
FIG. 8A shows an example of a switch and resistor configuration.
Figure 8B:
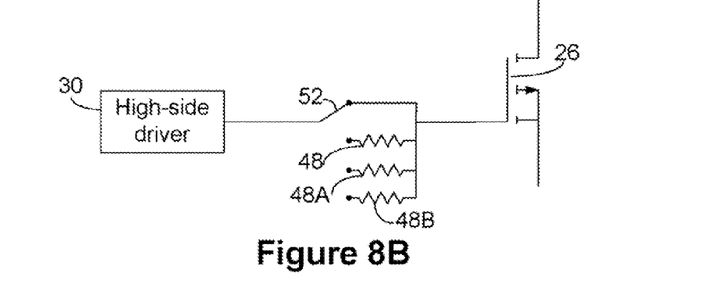
FIG. 8B shows another example of a switch and resistor configuration.

Referring again to the embodiment of FIG. 2, the resistors 48 and 50 are shown connected in series between their respective gate drivers and MOSFET gates; the switches 52 and 54 are shown as connected to opposite ends of their respective resistor s 48 and 50. Other configurations of resistors and switches are also within the scope of the present disclosure. FIGS. 8A and 8B shows alternative exemplary arrangements of resistors and switches: FIG. 8A shows the high-side driver 30 electrically connected to the switch 52, which can be connected directly to the gate of the MOSFET 26, or to the resistor 48, which is connected to the gate of the MOSFET 26; FIG. 8B shows the high-side driver 30 electrically connected to the switch 52, which can be connected directly to the gate of the MOSFET 26, or to any of the resistors 48, 48A, and 48B, which are connected to the gate of the MOSFET 26. The resistors 48, 48A, and 48B have different resistance, the resistor having the highest resistance is selected to reduce EMI the most (to decrease the slew rate the most); the resistor having the lowest resistance is selected to reduce EMI the less (to reduce the slew rate the less). In the embodiment of FIG. 8B, even though three resistors are shown, any suitable number of resistors can be used and still be within the scope of the present disclosure. In the embodiment of FIG. 8B, the resistor to which the switch 52 connects to reduce the slew rate of the resulting output electrical voltage (e.g., refer to plot 58 of FIG. 5A) can depend on several factors including, for example: a target slew rate, a target EMI signal.

As will be understood by the skilled worker, the embodiments of FIGS. 8A and 8B, relating to the high-side driver 30 and its related resistor, switch, and MOSFET, are also applicable to the low-side driver 32 of FIG. 1 and to its related components. Further, even though the embodiment of FIG. 2 is shown with the buck converter circuitry 24 of FIG. 3, it is to be understood that any other buck converter circuitry can be used as long as it allows for placement of a resistor and switch between an output of a gate driver and a gate of a modulation switch, for example, the gate of a MOSFET, in order to reduce the slew rate of an output electrical signal. Additionally, in the embodiments of FIGS. 2, 8A and 8B, it is possible to have an inductor between the high-side gate driver 30 and the MOSFET 26 in order to drive the MOSFET gate as hard as possible (i.e., in the case where there is no need to reduce the EMI signal); in this case, the inductor would need to be resonant at the pulse-width modulation frequency.

Figure 9:
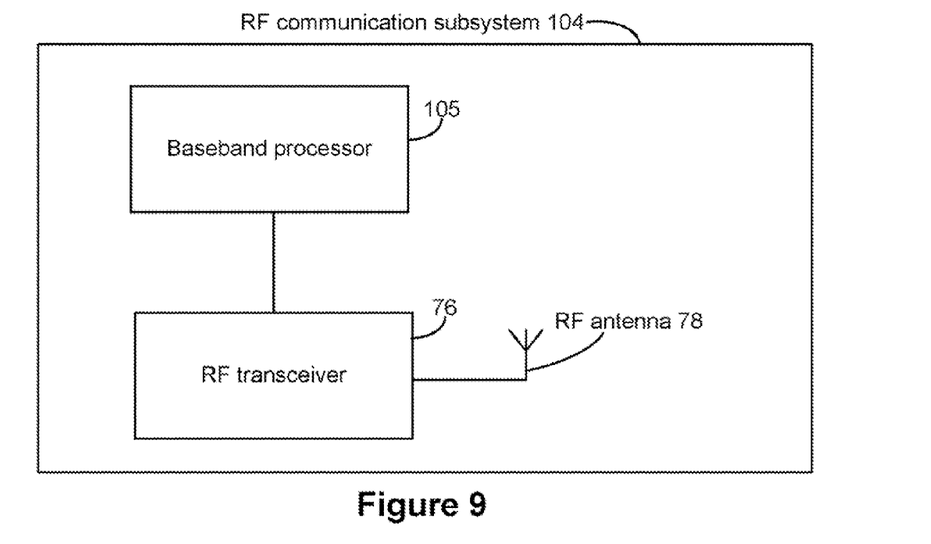
FIG. 9 shows an example of a radio frequency communication subsystem.

FIG. 9 shows an example of the RF communication subsystem 104, which includes the baseband processor 105, a RF transceiver 76 and a RF antenna 78. The baseband processor 105 can generate the RF activity status signal that is provided to the switch controller 56 of FIG. 2. Alternatively, the RF transceiver 76 itself can provide the RF activity status signal to the switch controller 56. Additionally, the switch controller 56 can be integrated in the RF communication subsystem 104 instead of being in the switch-mode power supply subsystem 20 of FIG. 1. The RF activity status signal can be any suitable signal, including a general purpose input/output (GPIO) signal, a mobile industry processor interface (MIPI) signal, a signal from a serial peripheral interface (SPI) bus, a signal from an inter-integrated circuit ($I^2C$) bus, a signal from a system power management interface (SPMI), a signal from a radio frequency front-end (RFFE), etc.

Figure 10:
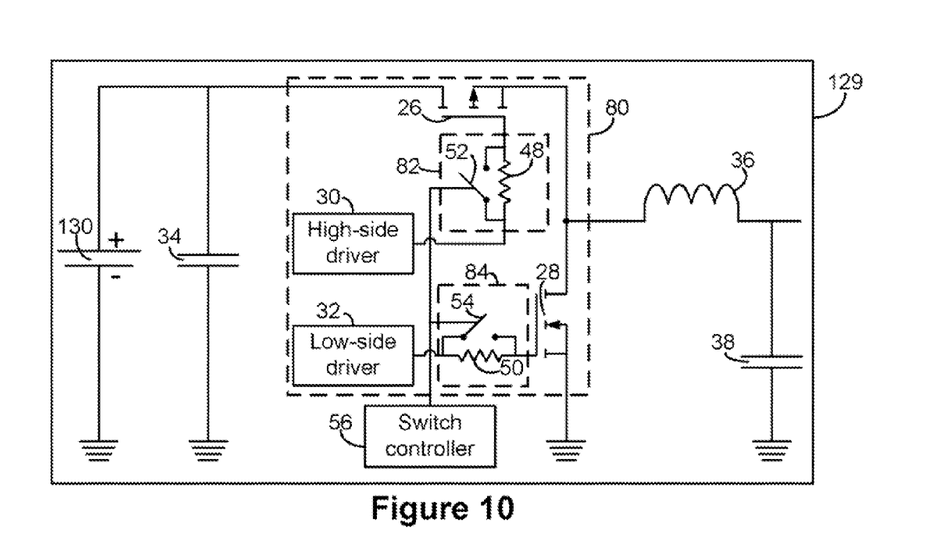
FIG. 10 shows an example of a switch-mode power supply subsystem.

FIG. 10 shows the switch-mode power supply subassembly 129 as comprising a modulator assembly 80, which includes the high-side driver 30, the low-side driver 32, the MOSFETs 26 and 28, the resistors 48 and 50, and the switches 52 and 54. The switches 52 and 54 can be referred to as slew rate switches. The switch 52 and the resistor 48 form a first switch assembly 82; the switch 54 and the resistor 50 form a second switch assembly 84. The switch assemblies 82 and 84 can also be referred to as slew rate switch assemblies. The switch assembly 82 has a resistance, which is equal to the resistance of the resistor 48 when the switch 52 is open, and which is very low, and lower than the resistance of the resistor 48, when the switch 52 is closed. The switch assembly 84 has a resistance, which is equal to the resistance of the resistor 50 when the switch 54 is open, and which is very low, and lower than the resistance of the resistor 50, when the switch 54 is closed. The switches 52 and 54 can by any suitable type of switches, including any suitable type of transistors, for example, MOSFETs and IGBTs. The MOSFETs 26 and 28 can be referred to as modulation switches or modulator switches. Even though MOSFETs are shown, any other suitable type of modulation switches can be used such as, for example, any suitable transistor (MOSFET, IGBTs, etc.).

Figure 11:
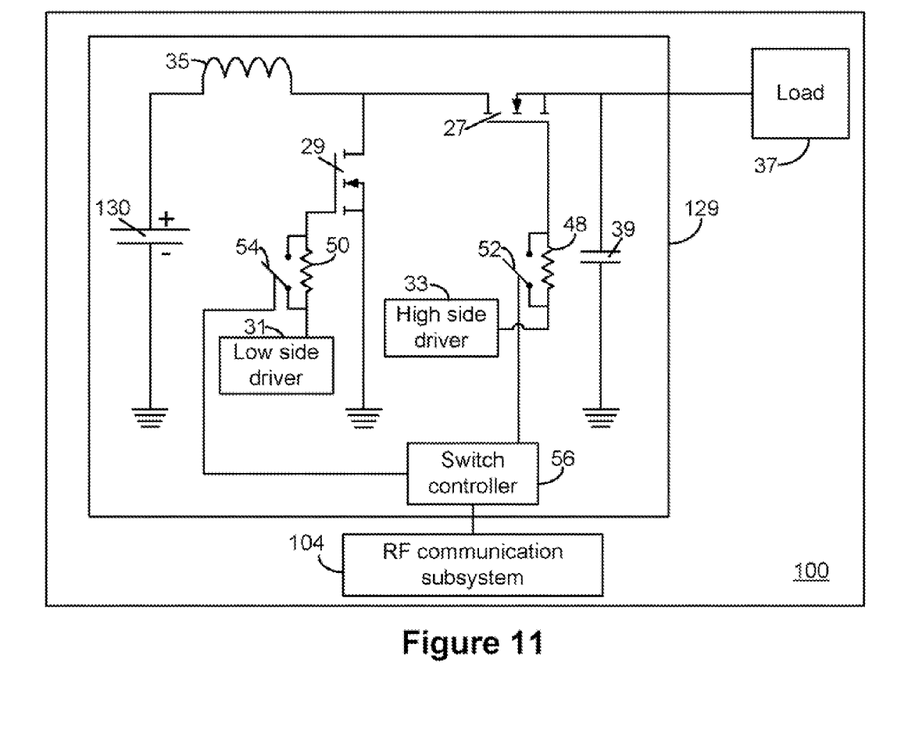
FIG. 11 shows another example of a portable electronic device.

FIG. 11 shows another embodiment of the portable electronic device 100 of the present disclosure. The portable electronic device 100 comprises a switch-mode power supply subsystem 129 operationally coupled to a RF communication subsystem 104. The switch-mode power supply subsystem 129 includes boost converter circuitry, an example of which is the boost converter circuitry 86 shown at FIG. 12. The boost converter circuitry 86 includes a battery 130, an inductor 35, a MOSFET 27, a MOSFET 29, a low-side driver 31, a high-side driver 33, and a capacitor 39. An output electrical signal is provided to the output 41 to which a load can be electrically connected.

Figure 12:
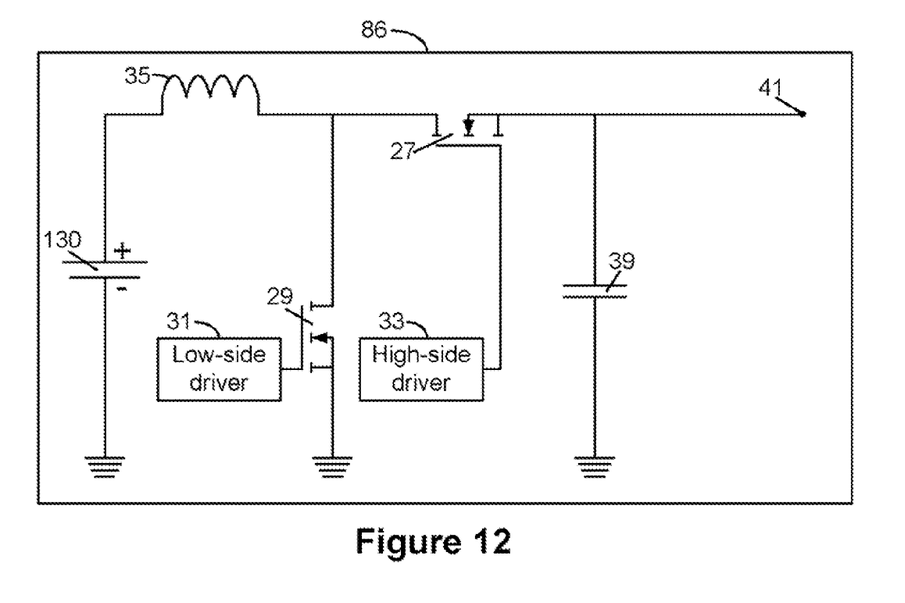
FIG. 12 shows boost converter circuitry used in the example of FIG. 11.

Returning to the embodiment of FIG. 11, the switch-mode power supply subsystem 129 includes the boost converter circuitry 86 of FIG. 12 to which resistors 48 and 50, and switches 52 and 54, have been added. The resistor 48 is connected in series between the high-side driver 33 and the gate of the MOSFET 27. The switch 52 is connected at opposite ends of the resistor 52. The resistor 50 is connected in series between the low-side driver 32 and the gate of the MOSFET 29. The switch 54 is connected at opposite ends of the resistor 50. Additionally, a switch controller 56 is electrically connected to the switches 52 and 54. The switches 52 and 54 are controlled by the switch controller 56, which is controlled by the RF communication subsystem 104 in the same manner as described in relation to the switches shown in the embodiment of FIG. 2. As shown in FIG. 11, the output of the switch-mode power supply assembly 129 is electrically connected to a load 37.

Even though the embodiment of FIG. 11 is shown with the boost converter circuitry 86 of FIG. 12, it is to be understood that any other boost converter circuitry can be used as long as it allows for placement of a resistor and switch between an output of a gate driver and a gate of a modulation switch, for example, the gate of a MOSFET, in order to reduce the slew rate of an output electrical signal. More generally, any suitable type of DC to DC converter that allows for placement of a resistor and switch between an output of a gate driver and a gate of a modulation switch, for example, the gate of a MOSFET, in order to reduce the slew rate of an output electrical signal is within the scope of the present disclosure.

The present disclosure may also be applicable to electrical signals other than those produce using pulse-width modulation. For example, the present disclosure may also be applicable to peak-and-valley control, constant off-time control, hysteretic control, etc.

Figure 13:
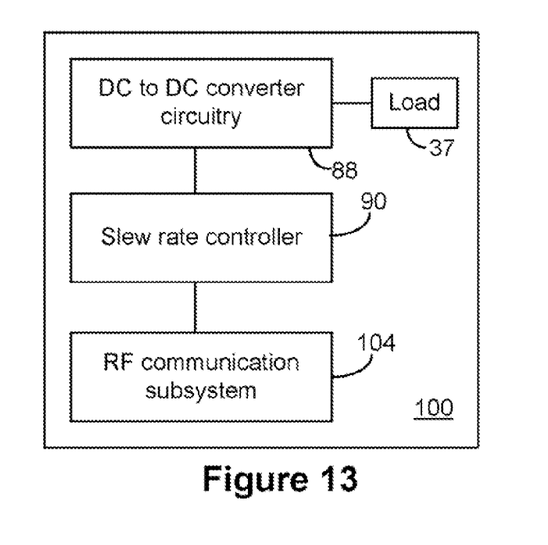
FIG. 13 shows another example of a portable electronic device.

FIG. 13 shows yet another embodiment of a portable electronic device 100 of the present disclosure. The portable electronic device includes DC to DC converter circuitry 88. Examples of DC to DC converter circuitry 88 are shown at FIG. 2 (buck converter circuitry) and at FIG. 11 (boost converter circuitry). The DC to DC converter circuitry 88 is operable to provide an output electrical signal to a load 37. The output electrical signal is a time-varying electrical signal with a slew rate and can be a pulse-width modulated signal or any other suitable type of time-varying electrical signal. The DC to DC converter circuitry 88 is operationally connected to a slew rate controller 90, which is operable to control the slew rate of the output electrical signal. An example of a slew rate controller is shown at FIGS. 2 and 11 where the switch controller 56, the switches 52 and 54, and the resistors 48 and 50 form a slew rate controller. The slew rate controller 90 is operationally connected to a RF communication subsystem 104. An example of a RF communication subsystem is shown at FIG. 9. When the RF communication subsystem 104 is inactive but is set to become active, that is, when the RF communication subsystem 104 is neither receiving nor transmitting and RF signal but is set to begin receiving or transmitting an RF signal, it provides a status signal (also referred to as a RF activity status signal) to the slew rate controller 90 to signal the slew rate controller to reduce the slew rate of the output electrical signal generated by the DC to DC converter circuitry 88. Conversely, the RF communication subsystem 104 is active but is set to become inactive, it provides a status signal to the slew rate controller 90 to the signal the slew rate controller to increase the slew rate of the output electrical signal generated by the DC to DC converter circuitry 88.

Figure 14:
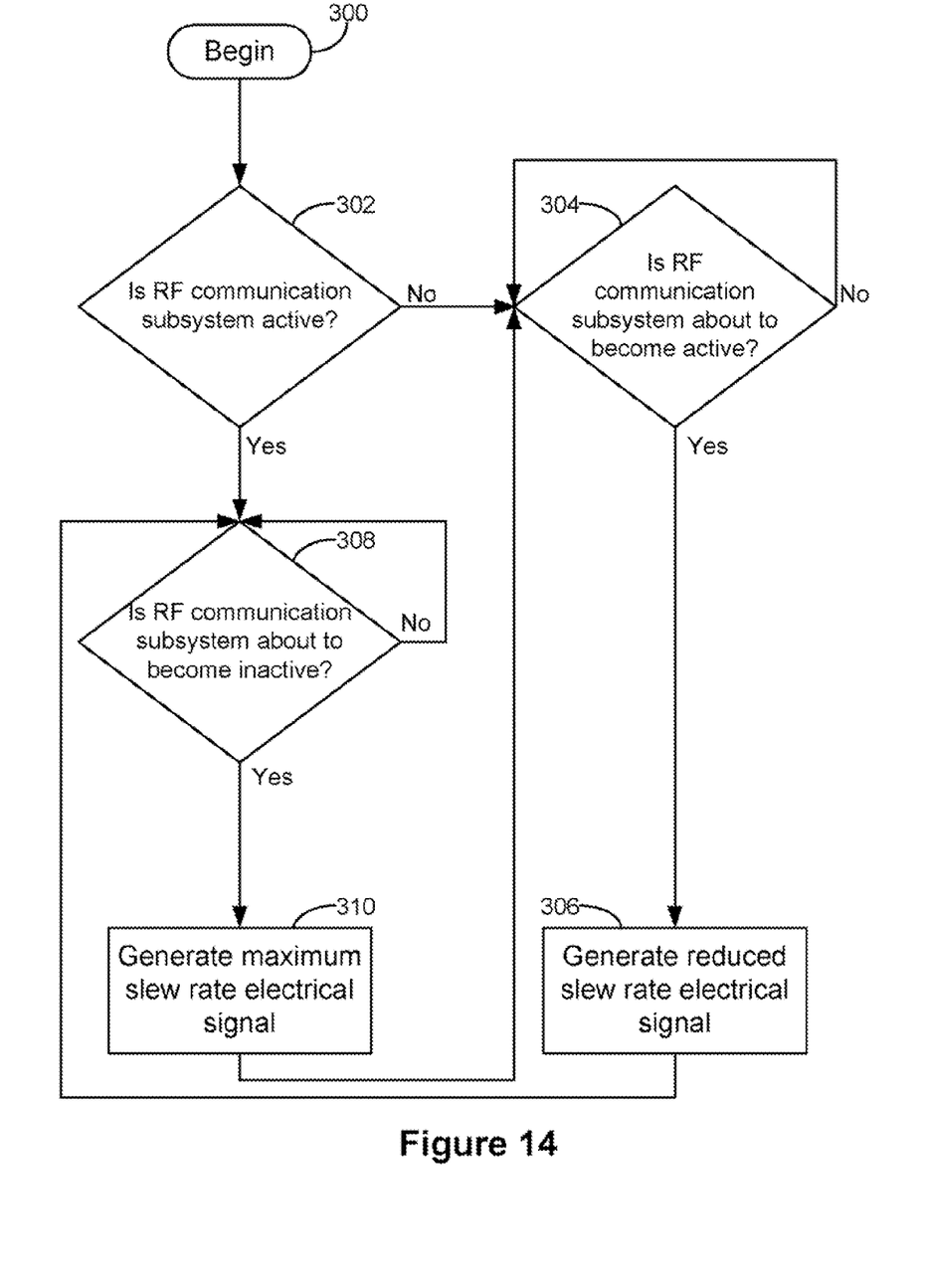
FIG. 14 shows a method in accordance with the present disclosure.

FIG. 14 shows an embodiment of a method in accordance with the present disclosure. The exemplary method of FIG. 14 can be performed by the main processor 102 of FIG. 1 or by the baseband processor 105 of the RF communication subsystem 104 of FIG. 1, or by any other suitable component of the portable electronic device 100.

The method of FIG. 14 begins at action 300 and proceeds to action 302 where it is determined if the RF communication subsystem 104 (FIGS. 1, 2, 9, 11) is active. If it is not active, the method proceeds action 304 where it is determined if the RF communication subsystem is about to become active. If the RF communication subsystem is still not active and is not about to become active, action 304 loops onto itself until the RF communication subsystem is about to become active. When the RF communication is about to become active, the method proceeds to action 306 where the slew rate of an output electrical signal generated by a switch-mode power supply subsystem is reduced. Examples of a switch-mode power supply subsystem 129 are shown at FIGS. 1, 2, and 11. The method then proceeds to action 308 where it is determined if the RF communication subsystem is about to become inactive. If it is not about to become inactive, action 308 loops onto itself. When the RF communication subsystem is about to become inactive, the flow proceeds to action 310 where the slew rate of the output electrical signal generated by the switch-mode power supply subsystem is set to a pre-determined value (e.g., a maximum value), which is higher than the value of the aforementioned reduced slew rate. Subsequent action 310, the method proceeds to action

304. Returning now to action 302, if it is determined that the RF communication subsystem is active, the method proceeds to action 308.

In the method of FIG. 14, whether the RF communication subsystem is about to become active or inactive can be determined by the RF communication subsystem itself that can provide an indication (an RF activity status signal) to the switch-mode power supply subsystem (the switch mode power supply subsystem receives the indication), which can modify the slew rate of its pulse-width electrical signal accordingly. That is, if the RF communication subsystem is about to become active, the switch-mode power supply can reduce the slew rate in order to reduce (decrease) an electromagnetic interference signal generated by the pulse-width electrical signal. Conversely, if the RF communication subsystem is about to become inactive, the switch-mode power supply can increase the slew rate in order to improve the modulation efficiency of the switch-mode power supply subsystem.

Present day portable electronic devices are often required to run high power applications compared to portable electronic devices of a few years ago. This means that present day portable electronic devices running high power applications produce more EMI than previous portable electronic devices. As such, concerns about EMI are greater now that they used to be, particularly with portable electronic devices that have RF communication capabilities, which can be affected by EMI levels. The approach presented above where the slew rate is reduced (to reduce EMI) during RF activity and the slew rate is increased during RF inactivity is therefore very much related to present day portable electronic devices.

Advantageously, the present disclosure may allow for a portable electronic device that has improved RF communication efficiency as well an improved battery lifetime. That is, by reducing the slew rate of the output electrical signal generated by the switch-mode power supply subsystem during RF activity (RF transmission or RF reception) of the portable electronic device, the EMI signal generated by the device is reduced, which leads to more efficient RF activity. Simply stated, as there is a lower EMI signal (reduced EMI signal), a RF signal being received or transmitted by the portable electronic device will be disturbed, by the EMI signal, to a lesser extent than if the slew rate had not been reduced and the EMI signal were full strength. As such, the RF signal in question can be received or transmitted by the portable electronic device without having to repeat the receive or transmit step as often as would be necessary if the EMI signal were full strength.

With respect to the improved battery lifetime, as the present disclosure reduces the slew rate only during RF activity, the resistive losses occurring in the resistors used to reduce the slew rate occur only when there is RF activity. This allows for less energy dissipation than if the slew rate were always at its reduced value in order to minimize EMI, such as to improve RF communication efficiency.

The present disclosure is also advantageous over known methods of controlling EMI in portable electronic devices and known methods of controlling the interaction of the EMI with RF signals associated with the portable electronic devices. Such a method is the forced pulse-width modulation method, which implements a control loop that requires more electrical power than required by the present disclosure. Typically speaking a DC to DC converter in prior art portable electronic devices has two modes of operation: (1) a low power mode with a variable frequency of switching (be it constant on time control, pulse skip mode, pulse frequency mode, etc.) and (2) a pulse width modulation mode. The pulse-width modulation mode operates at a fixed switching frequency, which controls the output EMI spectrum. That is, the EMI frequency spectrum is defined by pulse-width mode switching frequency. Forcing PWM mode of operation doesn't reduce the EMI, it only fixes it to a known state so adequate EMI filtering can be applied in order to minimize interaction between the EMI signal and the RF signals being transmitted or received by the portable electronic device. The EMI filtering reduces the efficiency of the power supply in all modes of operation. By contrast to forced pulse-width modulation, the present disclosure does more than controlling the frequency spectrum of an EMI signal. Rather, the present disclosure reduces the EMI signal.

The concepts of the present disclosure are a more adaptable to circumstances than previous methods of dealing with EMI (for example, in accordance with the present disclosure, EMI can be reduced only when RF activity is occurring). Further, the concepts of the present disclosure can be adapted to a variety of devices and can be implemented in small, readily portable electronic devices (such as handheld devices) with negligible effect upon size and weight.

As described above, the concepts of the present disclosure can entail trade-offs between the slew rate of a portable electronic device and the EMI produced by the portable electronic device. By reducing the slew rate during RF activity, resistive losses increase in the portable electronic device (the electrical efficiency of the portable electronic device decreases) but, the EMI produced by the portable electronic device is reduced, which can increase RF communication efficiency. By increasing the slew rate during RF inactivity, the electrical efficiency of the portable electronic device increases.

In the preceding description, for purposes of explanation, numerous details are set forth in order to provide a thorough understanding of the embodiments of the disclosure. However, it will be apparent to one skilled in the art that these specific details are not required in order to practice the disclosure. In other instances, well-known electrical structures and circuits are shown in block diagram form in order not to obscure the disclosure. For example, specific details are not provided as to whether the embodiments of the disclosure described herein are implemented as a software routine, hardware circuit, firmware, or a combination thereof.

Embodiments of the disclosure can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described disclosure can also be stored on the machine-readable medium. Software running from the machine-readable medium can interface with circuitry to perform the described tasks.

The above-described embodiments of the disclosure are intended to be examples only. Alterations, modifications and variations can be effected to the particular embodiments by those of skill in the art without departing from the scope of the disclosure, which is defined solely by the claims appended hereto.

What is claimed is:

1. A portable electronic device comprising:
   a radio frequency (RF) communication subsystem configured to generate a RF activity status signal indicative of a RF activity status of the RF communication subsystem; and
   a switch-mode power supply subsystem configured to receive the RF activity status signal, the switch-mode power supply subsystem operable to output an output electrical signal as a function of the RF activity status signal, the output electrical signal being a first output electrical signal when the RF activity status signal indicates inactivity of the RF communication subsystem, the output electrical signal being a second output electrical signal when the RF activity status signal indicates activity of the RF communication subsystem, the first output electrical signal being a pulse-width modulated signal having an initial slew rate, the second output electrical signal being a modified pulse-width modulated signal having a modified slew rate, the modified slew rate being less than the initial slew rate, the portable electronic device producing an electromagnetic interference (EMI) signal as a function of the output electrical signal, the EMI signal being lower for the second output electrical signal than for the first output electrical signal.

2. The device of claim 1 wherein the switch-mode power supply subsystem includes:
   a direct current voltage source to produce a voltage; and
   a modulator assembly operationally connected to the direct current voltage source to modulate the voltage to produce the output electrical signal, the modulator assembly including a modulator switch, a modulator switch driver to drive the modulator switch, and a slew rate switch assembly electrically connected between the modulator switch driver and the modulator switch, the slew rate switch assembly having a resistance value, the resistance value being selectable between an initial resistance value and a modified resistance value, the modified resistance value being greater than the initial resistance value, a selection of the resistance value being effected as a function of the RF activity status signal, the initial resistance value being selected when the RF activity status signal indicates inactivity of the RF communication subsystem, the modified resistance value being selected when the RF activity status signal indicates activity of the RF communication subsystem.

3. The device of claim 2 wherein the slew rate switch assembly includes a slew rate switch and a resistor.

4. The device of claim 3 wherein the modulator switch is a transistor.

5. The device of claim 4 wherein the transistor is a MOSFET or a IGBT.

6. The device of claim 1 wherein the RF communication subsystem includes a baseband processor and a RF transceiver, the baseband processor to generate the RF activity status signal, the RF activity status signal to indicate one of an activity of the RF transceiver and an inactivity of the RF transceiver.

7. The device of claim 6 wherein:
   the activity of the RF transceiver includes at least one of receiving a RF signal and transmitting a RF signal; and
   the inactivity of the RF transceiver includes neither receiving nor transmitting a RF signal.

8. The device of claim 1 wherein the RF communication subsystem includes a RF transceiver, the RF transceiver to generate the RF activity status signal RF, the RF activity status signal to indicate one of an activity of the RF transceiver and an inactivity of the RF transceiver.

* * * * *